Inventor
Herbert C. Rhodes

Nov. 12, 1940.　　　H. C. RHODES　　　2,221,328
PNEUMATIC DOUGH FEEDER
Filed Jan. 27, 1940　　　5 Sheets-Sheet 2

Inventor
Herbert C. Rhodes
By T. J. Geisler
and F. A. Geisler
Attorneys

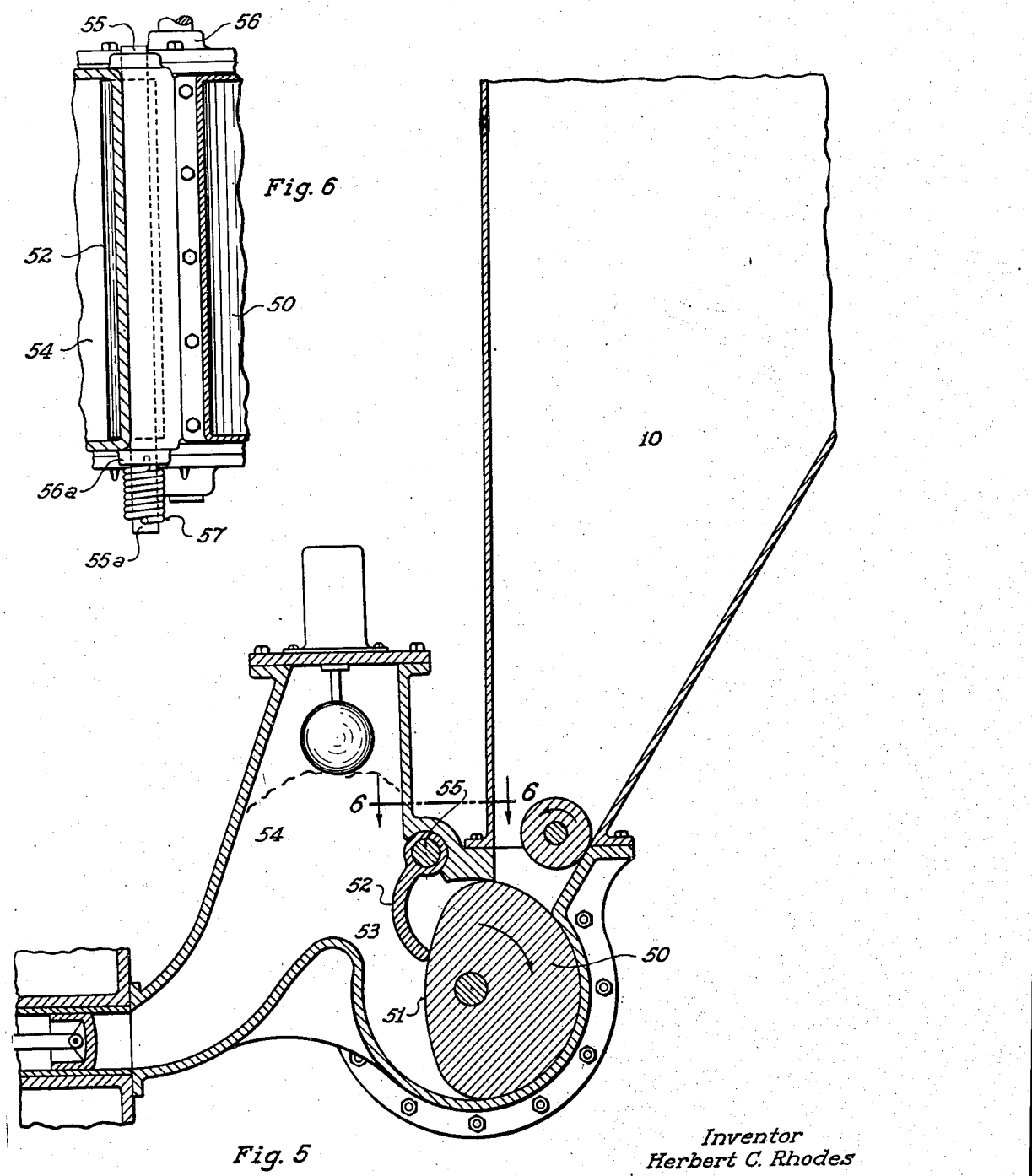

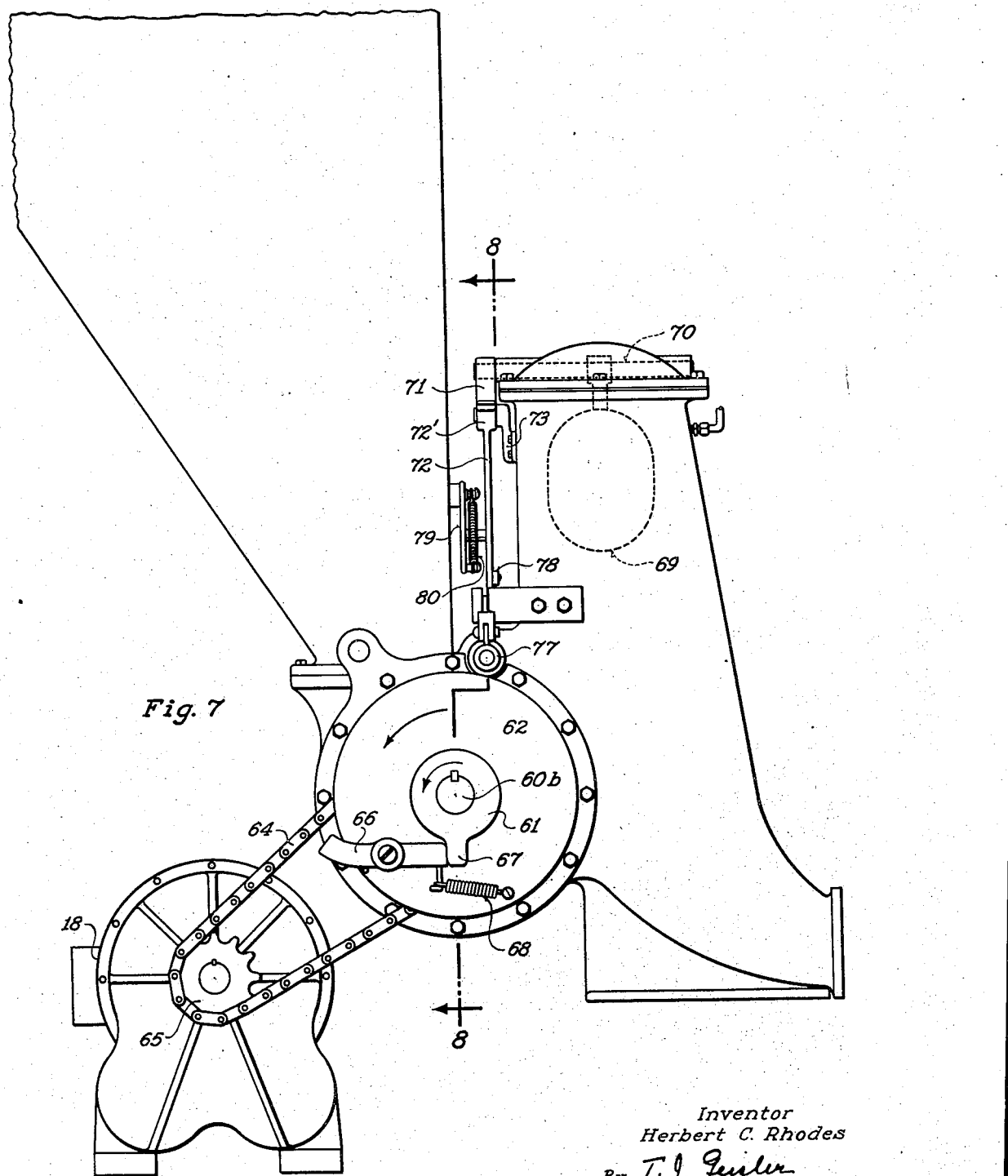

Nov. 12, 1940.  H. C. RHODES  2,221,328
PNEUMATIC DOUGH FEEDER
Filed Jan. 27, 1940  5 Sheets-Sheet 5

Inventor
Herbert C. Rhodes
By T. J. Geisler
and F. R. Geisler
Attorneys

Patented Nov. 12, 1940

2,221,328

UNITED STATES PATENT OFFICE 2,221,328

PNEUMATIC DOUGH FEEDER

Herbert C. Rhodes, Portland, Oreg.

Application January 27, 1940, Serial No. 315,977

4 Claims. (Cl. 107—15)

This application covers a modification and improvement of certain of the elements described in my co-pending application filed May 2, 1939, Ser. No. 271,269.

This invention concerns a pneumatic dough feeder which is designed to serve as a complementary dough feeding means for a dough-dividing machine of the type described in my United States Letters Patent, No. 2,128,406, issued August 31, 1939. This dough-dividing machine comprises, in brief, a rotating table having pockets in its rim portion into which pockets dough is fed from a hopper. A plunger is reciprocated in each pocket so as to admit dough into the pocket and then later expel the dough. It is necessary that the dough be fed into these pockets under an elastic pressure, in order to assure that the dough will follow closely the retraction of the plunger in its pocket and thus fill each of the plunger in its pocket and thus fill each pocket with a definite quantity of dough. But the dough must not be subjected to air under pressure greater than atmospheric pressure for too long a period of time, otherwise there appears to be an excessive breaking down of the cellular structure of the dough which results in what is known as "gassy" dough, thus making it difficult to mold the dough into the desired form, as, for example, for rolls. According to my observation and conclusion, the period during which dough is exposed to air under greater than atmospheric pressure should not exceed approximately two minutes.

One of the main objects of this present invention therefore, is to provide a dough feeder by which dough will be transferred from a receiving hopper to a pneumatic pressure chamber and from the pressure chamber to the dough-reciprocating pockets of the dough-dividing machine.

A further object of this invention is to provide means for retaining the dough in the pneumatic pressure chamber only a predetermined period of time.

To assure the periodic emptying of a pneumatic pressure chamber within successive maximum periods of time, and thus limit the time during which the dough contained in the pressure chamber will be exposed to the pressure therein, I control and limit the amounts of dough periodically transferred to the pressure chamber from the hopper. This I accomplish conveniently by means of a float which rides on the dough contained in the pressure chamber and by which I control the operation of the means which I provide for effecting a transfer of the dough from the receiving hopper to the pneumatic pressure chamber. The transfer of the dough from the receiving hopper to the pneumatic pressure chamber continues until a predetermined quantity of dough has been transferred to the pressure chamber, whereupon further operation of the transfer means is stopped until the pressure chamber has been substantially emptied.

I accomplish the transferring of unit portions of dough from the hopper to the pressure chamber by a cam-shaped transfer rotor, rotated at slow speed; and I arrange said control so that when the transfer rotor is stopped, its position will be such that its greater diameter will be substantially vertical with its dough-receiving cam-face under said hopper, thus causing the filling of the receiving side of the housing of said transfer rotor with dough from the hopper. I further provide a feeding roller at the outlet from the hopper to aid in the passage of the dough from the bottom of the hopper to the rotor housing and at the same time to exert a "rolling pin" action on the dough passing to the transfer rotor.

Further details of the construction and operation of my invention are hereinafter fully described with reference to the accompanying drawings.

In the drawings:

Fig. 5 is a vertical section, similar to Fig. 2, showing certain modifications in the design of the internal parts of the machine;

Fig. 6 is a fragmentary sectional plan taken on line 6—6 of Fig. 5;

Fig. 7 is an end elevation of a further modified form of my invention; and

Figures 1, 4:
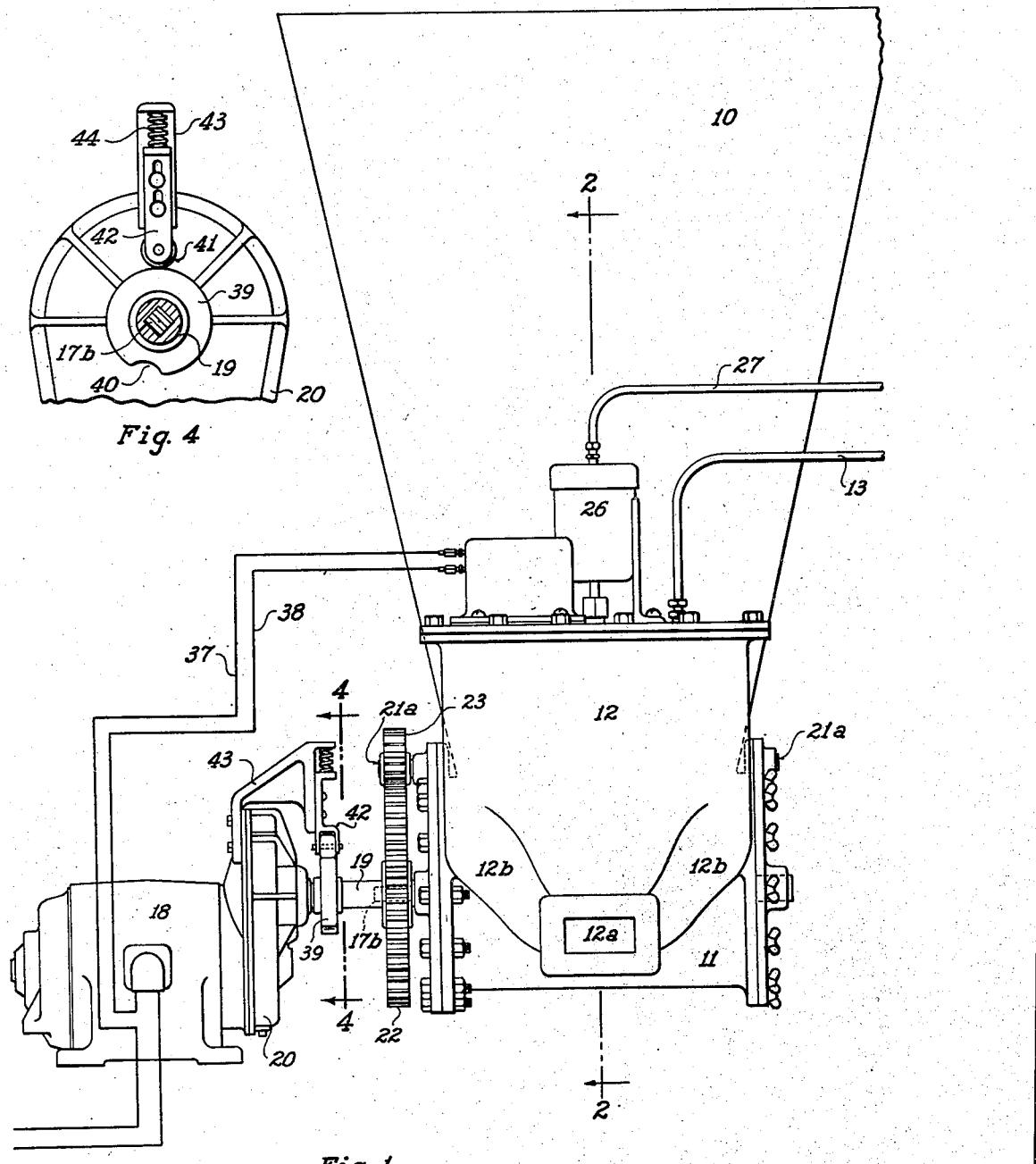
Fig. 1 is a front elevation showing a general view of my pneumatic dough feeding machine.
Fig. 4 is a fragmentary section on the line 4—4 of Fig. 1.
Figure 2:
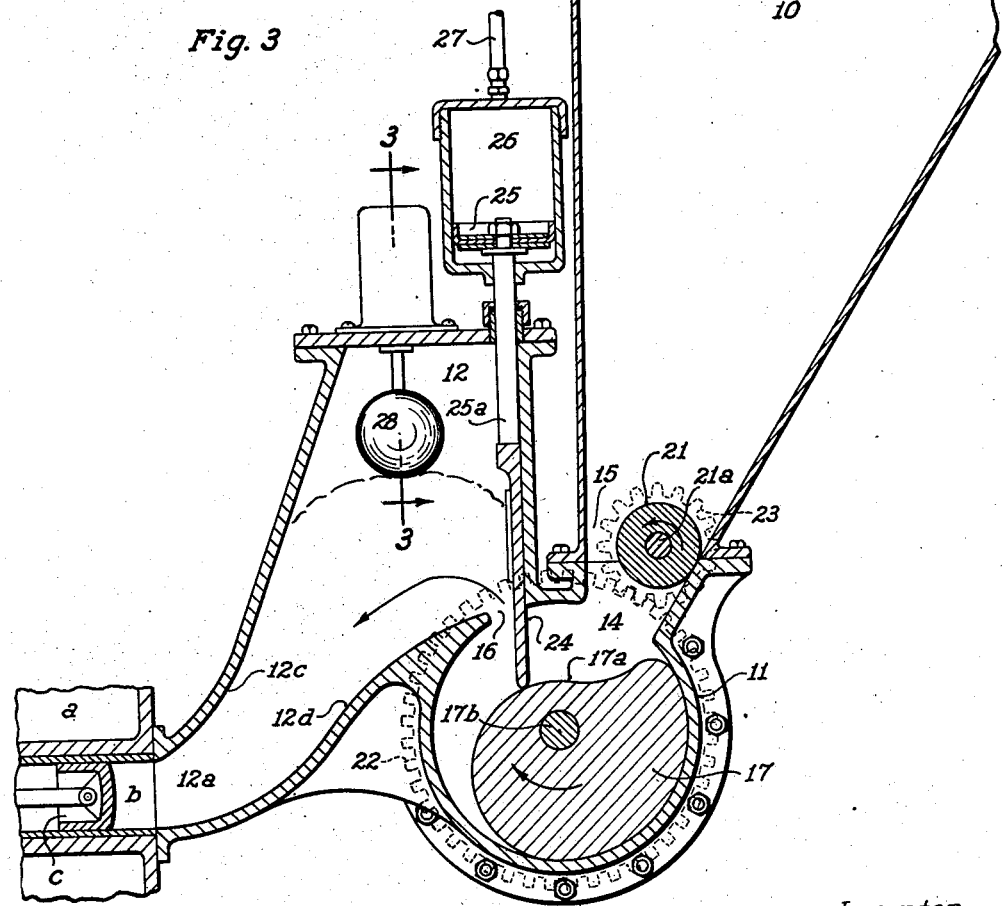
Fig. 2 is a vertical section taken on line 2—2 of Fig. 1 and drawn to a larger scale.

Referring first to Figs. 1 and 2, my invention comprises a hopper 10 in which the dough is initially placed, which hopper is mounted on a housing 11, of annular cross-section. Preferably formed integrally with, and at one side of the housing 11, is a gas-tight chamber 12 (hereinafter termed "pressure chamber") which is connected by a pipe 13 to any suitable source of compressed air. The interior of the housing 11 constitutes a passageway 14 connecting the discharge end or outlet 15 of the hopper 10 with said pressure chamber 12; the latter having an inlet port 16 preferably located in the upper part of the housing 11. Within the housing 11 is rotatably mounted a cam-shaped transfer rotor 17 having a dough receiving face 17a. The rotor 17 is mounted on a shaft 17b which is rotated clockwise through the medium of a motor 18, the squared end of the shaft 17b being disposed in a corresponding socket formed in a sleeve 19 which is connected through suitable speed reduction gears housed in a case 20 to the motor 18.

In the passageway 14 of the annular housing 11 at the base of the hopper 10, is a dough kneading and feeding roller 21 which extends the entire length of the interior of the housing 11 and which has its periphery in contact with one side of the housing as shown in Fig. 2, the said roller being keyed to a shaft 21a which is journaled in suitable bearings formed on the end plates of the housing 11. The shaft 21a and its roller 21 are driven from the sleeve 19 by means of a gear 22 (Fig. 1) keyed to said sleeve and a pinion 23 secured to the roller shaft, the direction of rotation of the roller shaft 21a thus being opposite to that of the rotor 17. The ratio of the gear and pinion is preferably made such that the roller 21 travels about four times as fast as the rotor 17 so that the roller will keep the passageway 14 filled with dough from the hopper 10.

On the peripheral face of the transfer rotor 17 is slidably but yieldingly seated a gate 24. Preferably, this gate is firmly but yieldingly held on the peripheral face of the rotor 17 by a piston 25 having a stem 25a which bears on the gate 24, said piston reciprocating in a cylinder 26 connected by a pipe 27 with a suitable source of air under compression. The gate 24 functions as a constantly sealing partition separating the dough-receiving and dough-discharging sides of the passageway 14, it being understood that the lower extremity of the gate 24 bears on the periphery of the rotor 17 and is such as to provide and maintain a substantially air-tight condition enabling the gate 24 to perform its designed function.

The operation of the device so far described is as follows: Dough gravitates in the hopper 10 toward the passageway 14 and is forced therethrough by the roller 21 which exerts a "rolling pin" action on the dough as it feeds it to the transfer rotor 17. This pressure compresses the dough and causes the cells or pockets that contain gases to collapse and forces the expelled gases upwardly in the hopper, the dough passing to the rotor thus being made of finer texture. The cam-faced transfer rotor is driven clockwise at such speed as to fill the pressure chamber 12 with a given quantity of dough within a predetermined limited period of time.

This period of time is determined relatively to the time required for the quantity of dough contained in the pressure chamber to be discharged through the outlet 12a of the pressure chamber which in turn is determined by the period in which the dough in the pressure chamber 12 may be subjected to air under pressure substantially greater than atmospheric without being deteriorated or affected in its quality. As mentioned in the introduction of this specification, my invention is intended to function as a complementary device for feeding dough to a dough-dividing machine of the type described by my said previous application for patent. A section of the annular rotated table of my said dough-dividing machine is designated by a in Fig. 2. The dough-receiving pocket provided in the rim portion of said table is designated b and the piston reciprocating in said pocket is designated c. In practice my pneumatic dough feeder constituting my present invention is cooperatively arranged as illustrated by Fig 2. Thus the neck or discharge outlet 12a of the pressure chamber 12 is arranged to discharge into the pocket b of the rotatable table of my dough-dividing machine.

Figure 3:
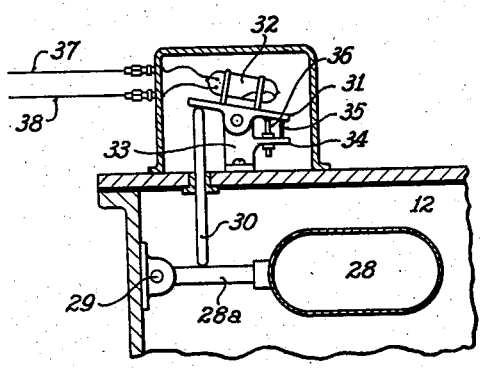
Fig. 3 is a fragmentary section corresponding to line 3—3 of Fig. 2 and illustrating certain details of construction.

In order to limit the quantity of dough which will be transferred from the hopper 10 by the transfer rotor 17 to the pressure chamber 12 to such quantity as may be expelled from the pressure chamber by the air pressure therein maintained within the predetermined limited period of time, which preferably should not exceed approximately two minutes, I provide a control for the device affecting the rotation of the transfer rotor 17. Such control I found convenient to construct in the form of a float 28 (see also Fig. 3), having a stem 28a pivotally mounted as at 29 within the pressure chamber 12. On the stem 28a rests a vertically reciprocable rod 30 which bears against a rockable plate 31 carrying a conventional mercury switch 32. The rockable plate 31 is mounted in a bracket 33 which has a laterally-extending arm 34 on which is mounted a helical compression spring 35 normally tending to rock the plate 31 counterclockwise. A stop 36 limits the reverse or clockwise rocking of the plate 31. The mercury switch 32 has conductors 37 and 38 constituting one of the electric power supplying leads to the motor 18. The float 28 rides on the dough contained in the pressure chamber 12, and when the level of dough reaches a predetermined height, the rotation of the transfer rotor 17 is stopped; and when the dough level falls below a predetermined point said transfer rotor is started again.

As previously mentioned, the quantity of dough transferred from the hopper 10 to the pressure chamber 12 must be limited to such quantity as will be discharged from the pressure chamber within a given interval of time, preferably approximately two minutes, and the lowest level to which the dough contained in the pressure chamber 12 is permitted to drop should be approximately two inches above the inlet 16 in the pressure chamber. The fixing of the lowest level of the dough contained in the pressure chamber is for the purpose of assuring that the dough held on the discharge side of the gate 24 while the rotor 17 is in action will supplement the sealing function of said gate and prevent air from passing out of the pressure chamber 12 to the dough receiving side of the gate. The maximum height to which the dough in the pressure chamber is permitted to rise must be predetermined so that a quantity of dough equal to the charge of dough received from the rotor housing chamber 14 will be discharged from the pressure chamber 12 in the interval during which the transfer rotor 17 is at rest and subsequently replaced by a fresh charge of dough from the hopper 10 when the rotor is again placed in motion. To facilitate the discharging of the dough, I found that the lower portion of the walls of the pressure chamber 12 should taper downwardly and toward the outlet 12a substantially as shown at 12b in Fig. 1 and at 12c and 12d in Fig. 2.

In order to assure the proper functioning of the transfer rotor 17, it is rotated at slow speed and the rotation controlled in such manner that when the motor power is cut off the rotor will be caused to stop in the position shown in Fig. 2 so that its dough receiving cam-face 17a will be under the hopper 10. In order to accomplish this, a disc 39 is keyed on the sleeve 19 of the speed reducing unit and has a semi-circular notch 40 in its periphery as shown in Fig. 4. A roller 41 is carried in a yoke 42 which is slidably mounted on a bracket 43 and the roller 41 is held in constant contact with the periphery of the disk 39 by a compression spring 44 which bears on the yoke 42. Consequently, the roller 41 drops into the notch 40 of the disk 39 at each revolution of the latter and, when the power to the motor 18 is shut off by the mercury switch 32, the usual subsequent coasting or idling of the motor continues only until said roller 41 enters the notch 40 and arrests further rotation of the transfer rotor 17, thus stopping the rotor in the desired position.

In Figs. 5 and 6, I have illustrated a modified form of my invention in which I employ a modified dough-transferring rotor and complementary parts. The rotor 50 in this modified construction is shaped substantially as shown in Fig. 5, and perhaps best described as of cylindrical cross-section with approximately one-third cut away to provide a flatly curved surface 51. I have found that in practical use this modified rotor functions even more efficiently than the rotor shown in Fig. 2 in that a more positive transfer of dough is obtained with more compressive force or kneading pressure exerted upon the dough during its forced passage from the hopper 10 to the discharging chamber. Furthermore, the changed design of the rotor enables a simple hinged pendent gate 52 to be employed, which gate, during the operation of the machine, is held against the rotor by the pressure in the discharging chamber, thus dispensing with the vertically sliding gate 24 of Fig. 2 which is actuated by air pressure from a separate source.

The gate 52 extends the full length of the interior of the rotor housing and is preferably curved as shown in Fig. 5 and is keyed to a shaft 55 journaled in bearing 56, 56 at each end (see Fig. 6).

Under operating conditions when there is dough under pressure in the discharge chamber 54, as previously described, the curved gate 52 is held in constant contact with the surface of the rotor 50 and serves as a sealing closure between the dough transfer chamber below the hopper 10 and the discharge chamber. However, when the device is initially placed in operation with little or no pressure in the discharge chamber, the gate is forced against the rotor by a torsion spring 57 disposed on the extended end 55a of the shaft 55 as illustrated in Fig. 6, one end of the spring being secured to the shaft and the other to the bearing 56a or other rigid member. The discharge chamber 54 may, of course, be made narrower because of eliminating the sliding gate of the previously explained embodiment and the bottom wall must be cut back to accommodate the movement of the curved gate; however, with the exception of these changes and the substitution of the modified rotor and gate, this modified construction of my device is similar to that shown in Figs. 1 to 4 and both operate in the manner explained.

Figure 8:
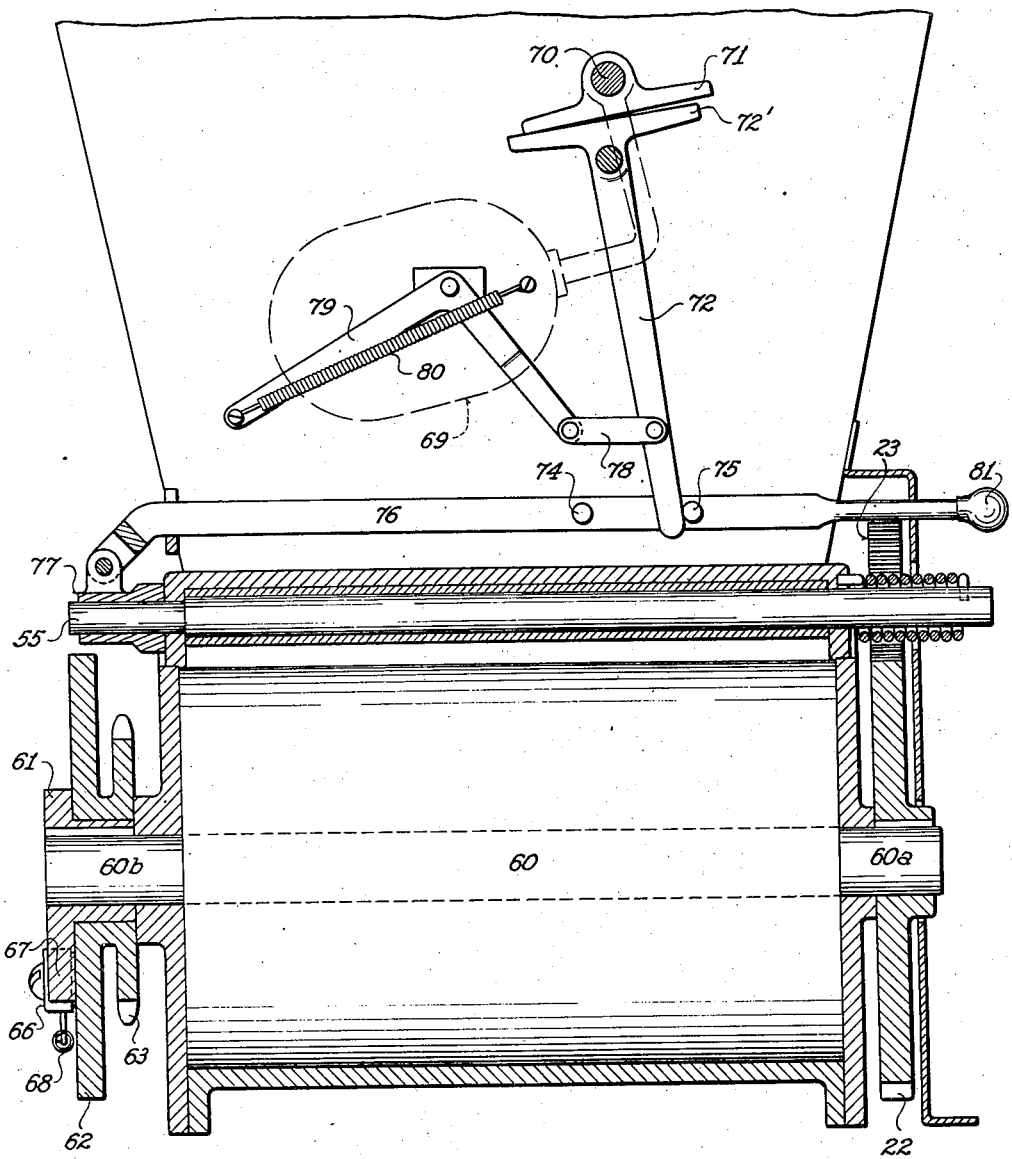
Fig. 8 is a staggered vertical section corresponding to line 8—8 of Fig. 7.

In the modified form of my pneumatic dough feeder illustrated in Figs. 7 and 8, I provide means for controlling the rotation of the dough transfer rotor independently of the operation of the electric motor 18 so that the rotor may be stopped and started in accordance with the dough-feeding requirements of the machine while the motor may be permitted to run continuously. This eliminates the spasmodic operation of the electric motor thereby materially increasing its efficiency and performance, and dispenses with the need for the mercury switch 32 and for the disc and roller positioning device shown in Fig. 4, the function of the latter parts being now performed by the float-operated rotor control means.

My comparing Figs. 1, 7 and 8 it will be seen that the gear 22 and pinion 23 in the modified construction are placed at the opposite end of the rotor and that the electric motor 18 has been moved to the rear of the machine. The gear 22 is keyed to the extended portion 60a of the rotor shaft 60 and the pinion 23 to the adjacent end of the kneading roller shaft 21a (Fig. 8). To the opposite end 60b of the rotor shaft is keyed a flanged sleeve 61 upon which is rotatably mounted a disc 62 having an integrally-formed sprocket 63. The sprocket 63 is connected by an endless chain 64 (Figure 7), to the sprocket 65 on the electric motor shaft.

A latch 66, pivotally mounted on the disc 62 is positioned to normally engage a lug 67 on the flange of the sleeve 61 and is retained in this position by an extension spring 68 also mounted on the disc 62. The latch 66 constitutes the sole means for coupling the freely mounted disc and its sprocket to the rotor shaft and if released from contact with the lug 67 will permit the disc and sprocket to be rotated independently of the rotor shaft 60. The release is effected by the operation of mechanism connected to the pressure chamber float 69. In this modified construction I use the rotor 51 and gate 52 shown in Fig. 5.

The float 69 is fastened to a bent rod which is keyed to a shaft 70 journaled in the cover of the pressure chamber, and the extended end of this shaft carries a bar 71 adapted to engage a corresponding bar 72' formed as part of a T-shaped rocker 72. The T-shaped rocker 72 is pivotally mounted on a bracket 73 supported on the outside of the pressure chamber. The depending end of the T-shaped rocker 72 is adapted to engage pins 74 and 75 set in a rod 76. The forward end of this rod 76 is bent downwardly and bifurcated and connected to a sleeve 77 slidably disposed on the extended end of the gate shaft 55.

The T-shaped rocker 72 is coupled by a link 78 to a snap over spring device comprising bell crank 79 and spring 80. As previously stated, the rotor shaft is caused to be drivingly rotated by the engagement of the latch 66 with the lug 67; however, as the float 69 (shown superimposed in Fig. 8) is caused to rise by the dough forced into the pressure chamber by the rotor, the bar 71 will engage the rocker 72 and cause it to move to the left between the pins 74 and 75, thus swinging the bell crank 79. When said crank passes center the snap over spring 80 will exert a quick pull on the rocker 72 and swing it into contact with the pin 74 and thus will thrust the rod 76 endwise so that the attached sleeve 77 will slide into the path of the latch 66 as the latch 66 is carried around by the rotating disc 62. The latch 66 will thus be disengaged from the lug and the movement of the rotor will cease until the sleeve 77 is withdrawn from the path of the latch. The arrangement of the parts is such that the rotor will be stopped with its major axis vertical so as to prevent air escaping from the pressure chamber as previously explained.

The rotor will remain at rest so long as the sleeve 77 lies in the path of the latch on the motor-driven disc, said latch being ripped at each revolution. However, as the float descends with the discharge of the dough, the rocker 72 will be gradually moved to the right and upon operation of the snap over device will exert a quick thrust on the pin 75 and move the rod 76 and sleeve 77 out of the path of the latch and thereby permit the rotor to be rotated. A knob 81 is provided on one end of the reciprocable rod 76 for manual stopping of the rotor at any time.

The specific details above described of the construction of my pneumatic dough feeder are to be understood as merely such as I found convenient for carrying my invention into practice, but the same may be varied as deemed expedient so long as the principle of operation of my invention is maintained.

I claim:

1. In a pneumatic dough feeder, a hopper, a chamber chargeable with pneumatic pressure for receiving and expelling dough under said pressure, means for transferring dough from said hopper to said chamber, said means comprising a passageway of annular cross-section, a cam-shaped transfer rotor in said passageway, a gate bearing against said rotor and cooperating with said rotor to separate the outlet side from the inlet side of said passageway, a roller rotated in the discharge outlet of said hopper whereby to exert a pushing and a squeezing action of the dough passing from said hopper into said passageway, and means for rotating said rotor and said roller in opposite directions and in synchronism with each other.

2. In a pneumatic dough feeder, a hopper, a chamber chargeable with pneumatic pressure for receiving and expelling dough under said pressure, means for transferring dough from said hopper to said chamber, said means comprising a passageway of annular cross-section, a cam-shaped transfer rotor in said passageway, a gate bearing against said rotor and cooperating with said rotor to separate the outlet side from the inlet side of said passageway, a roller rotated in the discharge outlet of said hopper whereby to exert a pushing and a squeezing action of the dough passing from said hopper into said passageway, means for rotating said rotor and said roller, in opposite directions and in synchronism with each other and means including a float in said pressure chamber for controlling the rotation of said rotor and roller and thereby the quantity of dough transferred to said chamber.

3. In a pneumatic dough feeder, a hopper, a chamber chargeable with pneumatic pressure for receiving and expelling dough under said pressure, and means for transferring dough from said hopper to said chamber, such means comprising a passageway of annular cross-section between said hopper and said chamber, a motor-actuated cam-shaped transfer-rotor in said passageway, and a gate riding on said transfer rotor and in cooperation therewith separating the inlet and outlet sides of said passageway, said gate being hinged in the outlet side of said passageway, and being adapted to be firmly held on said transfer rotor by the pressure in said chamber.

4. In a pneumatic dough feeder, a hopper, a chamber chargeable with pneumatic pressure for receiving and expelling dough under said pressure, and means for transferring dough from said hopper to said chamber, such means comprising a passageway of annular cross-section between said hopper and said chamber, a motor-actuated cam-shaped transfer-rotor in said passageway, and a gate riding on said transfer rotor and in cooperation therewith separating the inlet and outlet sides of said passageway, said gate being hinged in the outlet side of said passageway and curved in cross-section towards said transfer-rotor, and being adapted to be firmly held on said transfer rotor by the pressure in said chamber.

HERBERT C. RHODES.